US008626670B2

(12) United States Patent
New et al.

(10) Patent No.: US 8,626,670 B2
(45) Date of Patent: Jan. 7, 2014

(54) SYSTEM AND METHOD FOR IMPROVED PORTABLE MEDIA FILE RETENTION

(75) Inventors: Matthew David New, Irvine, CA (US); Jonathan Cooper Ochenas, Santa Monica, CA (US); Carl Joseph Sobeski, West Pittston, PA (US)

(73) Assignee: Yahoo! Inc., Sunnyvale, CA (US)

( * ) Notice: Subject to any disclaimer, the term of this patent is extended or adjusted under 35 U.S.C. 154(b) by 1689 days.

(21) Appl. No.: 11/303,096

(22) Filed: Dec. 16, 2005

(65) Prior Publication Data

US 2006/0195403 A1  Aug. 31, 2006

Related U.S. Application Data

(60) Provisional application No. 60/678,718, filed on May 5, 2005, provisional application No. 60/657,222, filed on Feb. 28, 2005.

(51) Int. Cl.
*G06Q 30/00* (2012.01)

(52) U.S. Cl.
USPC ........... 705/59; 705/26.1; 705/26.5; 705/26.8

(58) Field of Classification Search
USPC ..................... 705/50–51, 59, 26.1, 26.5, 26.8
See application file for complete search history.

(56) References Cited

U.S. PATENT DOCUMENTS

| | | |
|---|---|---|
| 5,566,353 A | 10/1996 | Cho et al. |
| 5,616,876 A | 4/1997 | Cluts |
| 5,729,741 A | 3/1998 | Liaguno et al. |
| 5,748,956 A | 5/1998 | Lafer et al. |
| 5,864,870 A | 1/1999 | Guck |
| 5,886,698 A | 3/1999 | Sciammarella et al. |
| 5,890,152 A | 3/1999 | Rapaport et al. |

(Continued)

FOREIGN PATENT DOCUMENTS

| | | |
|---|---|---|
| EP | 1 176 840 | 1/2002 |
| EP | 1 489 800 | 12/2004 |

(Continued)

OTHER PUBLICATIONS

Mclean et al. ("Interoperability between Information and Learning Environments—Bridging the Gaps, A Joint White Paper on behalf of the IMS Global Learning Consortium and the Coalition for Networked Information", Jun. 28, 2003, 13 pages).*

(Continued)

*Primary Examiner* — James D Nigh
(74) *Attorney, Agent, or Firm* — Berkeley Law & Technology Group, LLP

(57) ABSTRACT

A method of acquiring rights to content to be burned to a CD, comprising defining a first content set; defining a second content set comprised of content selected from the first content set whose content attributes match those selected by a user; identifying as a third content set that content in the second content set for which DRM rights sufficient to permit the content to be burned to CD are not currently possessed; allowing a user to authorize obtaining rights for members of the second content set for which rights permitting the content to be burned to CD are not currently possessed; obtaining rights which allow at least a subset of the third content set to be burned to CD; and, allowing the content defined in the second content set and for which appropriate rights have been obtained to be burned to CD.

25 Claims, 6 Drawing Sheets

(56) References Cited

U.S. PATENT DOCUMENTS

| | | |
|---|---|---|
| 5,903,892 A | 5/1999 | Hoffert et al. |
| 5,928,330 A | 7/1999 | Goetz et al. |
| 5,950,173 A | 9/1999 | Perkowski |
| 5,982,369 A | 11/1999 | Sciammarella et al. |
| 5,996,015 A | 11/1999 | Day et al. |
| 6,064,380 A | 5/2000 | Swenson et al. |
| 6,118,450 A | 9/2000 | Proehl et al. |
| 6,157,377 A | 12/2000 | Shah-Nazaroff et al. |
| 6,192,340 B1 | 2/2001 | Abecassis |
| 6,226,672 B1 | 5/2001 | DeMartin et al. |
| 6,232,539 B1 | 5/2001 | Looney et al. |
| 6,248,946 B1 | 6/2001 | Dwek |
| 6,356,971 B1 | 3/2002 | Katz et al. |
| 6,389,467 B1 | 5/2002 | Eyal |
| 6,393,430 B1 | 5/2002 | Van Ryzin |
| 6,466,918 B1 | 10/2002 | Spiegel et al. |
| 6,477,704 B1 | 11/2002 | Cremia |
| 6,484,199 B2 | 11/2002 | Eyal |
| 6,526,411 B1 | 2/2003 | Ward |
| 6,538,665 B2 | 3/2003 | Crow et al. |
| 6,605,770 B2 | 8/2003 | Yamane et al. |
| 6,609,096 B1 | 8/2003 | De Bonet et al. |
| 6,662,231 B1 | 12/2003 | Drosset et al. |
| 6,691,162 B1 | 2/2004 | Wick |
| 6,721,489 B1 | 4/2004 | Benyamin et al. |
| 6,728,729 B1 | 4/2004 | Jawa et al. |
| 6,731,312 B2 | 5/2004 | Robbin |
| 6,735,628 B2 | 5/2004 | Eyal |
| 6,738,766 B2 | 5/2004 | Peng |
| 6,816,944 B2 | 11/2004 | Peng |
| 6,820,238 B1 | 11/2004 | Auflick et al. |
| 6,829,033 B2 | 12/2004 | Hose et al. |
| 6,850,256 B2 | 2/2005 | Crow et al. |
| 6,928,433 B2 | 8/2005 | Goodman et al. |
| 6,941,324 B2 | 9/2005 | Plastina et al. |
| 6,968,179 B1 | 11/2005 | De Vries |
| 6,987,221 B2 | 1/2006 | Platt |
| 7,013,290 B2 | 3/2006 | Ananian |
| 7,020,704 B1 | 3/2006 | Lipscomb et al. |
| 7,024,424 B1 | 4/2006 | Platt et al. |
| 7,043,477 B2 | 5/2006 | Mercer et al. |
| 7,096,234 B2 | 8/2006 | Plastina et al. |
| 7,111,009 B1 | 9/2006 | Gupta et al. |
| 7,113,767 B2 | 9/2006 | Vaananen |
| 7,127,454 B2 | 10/2006 | Deguchi |
| 7,136,874 B2 | 11/2006 | Mercer et al. |
| 7,146,404 B2 | 12/2006 | Kay et al. |
| 7,159,000 B2 | 1/2007 | Plastina et al. |
| 7,219,308 B2 | 5/2007 | Novak et al. |
| 7,275,063 B2 | 9/2007 | Horn |
| 7,277,852 B2 | 10/2007 | Iyoku et al. |
| 7,281,034 B1 | 10/2007 | Eyal |
| 7,310,350 B1 | 12/2007 | Shao et al. |
| 7,409,639 B2 | 8/2008 | Dempski et al. |
| 7,698,223 B2 * | 4/2010 | Padawer et al. ............... 705/51 |
| 2001/0018858 A1 | 9/2001 | Dwek |
| 2001/0033296 A1 | 10/2001 | Fullerton et al. |
| 2001/0042107 A1 | 11/2001 | Palm |
| 2002/0002498 A1 | 1/2002 | Hatakeyama |
| 2002/0010652 A1 | 1/2002 | Deguchi |
| 2002/0010759 A1 * | 1/2002 | Hitson et al. ............... 709/219 |
| 2002/0040326 A1 | 4/2002 | Spratt |
| 2002/0042834 A1 | 4/2002 | Kremens et al. |
| 2002/0045960 A1 | 4/2002 | Phillips et al. |
| 2002/0049037 A1 | 4/2002 | Christensen et al. |
| 2002/0052933 A1 | 5/2002 | Leonhard et al. |
| 2002/0054134 A1 | 5/2002 | Kelts |
| 2002/0087887 A1 | 7/2002 | Busam et al. |
| 2002/0089529 A1 | 7/2002 | Robbin |
| 2002/0099731 A1 | 7/2002 | Abajian |
| 2002/0126135 A1 | 9/2002 | Ball et al. |
| 2002/0138619 A1 | 9/2002 | Ramaley et al. |
| 2002/0151327 A1 | 10/2002 | Levitt |
| 2002/0152267 A1 | 10/2002 | Lennon |
| 2002/0156546 A1 | 10/2002 | Ramaswamy |
| 2002/0188363 A1 | 12/2002 | Ashy |
| 2003/0023427 A1 | 1/2003 | Cassin et al. |
| 2003/0028539 A1 | 2/2003 | Nunome et al. |
| 2003/0031176 A1 | 2/2003 | Sim |
| 2003/0037035 A1 | 2/2003 | Deguchi |
| 2003/0041108 A1 | 2/2003 | Henrick et al. |
| 2003/0046273 A1 | 3/2003 | Deshpande |
| 2003/0046399 A1 | 3/2003 | Boulter et al. |
| 2003/0065639 A1 | 4/2003 | Fiennes et al. |
| 2003/0071851 A1 | 4/2003 | Unger et al. |
| 2003/0088571 A1 | 5/2003 | Ekkel |
| 2003/0110502 A1 | 6/2003 | Creed |
| 2003/0151618 A1 | 8/2003 | Johnson et al. |
| 2003/0172090 A1 | 9/2003 | Asunmaa et al. |
| 2003/0182254 A1 | 9/2003 | Plastina et al. |
| 2003/0182315 A1 | 9/2003 | Plastina et al. |
| 2003/0191753 A1 | 10/2003 | Hoch |
| 2003/0200452 A1 | 10/2003 | Tagawa et al. |
| 2003/0212710 A1 | 11/2003 | Guy |
| 2003/0222907 A1 | 12/2003 | Heikes et al. |
| 2003/0223411 A1 | 12/2003 | de la Fuente |
| 2003/0225834 A1 | 12/2003 | Lee et al. |
| 2003/0225848 A1 | 12/2003 | Heikes et al. |
| 2003/0228134 A1 | 12/2003 | Kim et al. |
| 2003/0236582 A1 | 12/2003 | Zamir et al. |
| 2003/0236711 A1 | 12/2003 | Deguchi |
| 2003/0236832 A1 | 12/2003 | McIntyre et al. |
| 2003/0237043 A1 | 12/2003 | Novak |
| 2004/0002938 A1 | 1/2004 | Deguchi |
| 2004/0003090 A1 | 1/2004 | Deeds |
| 2004/0003706 A1 | 1/2004 | Tagawa et al. |
| 2004/0019497 A1 | 1/2004 | Volk et al. |
| 2004/0055445 A1 | 3/2004 | Iyoku et al. |
| 2004/0056901 A1 | 3/2004 | March et al. |
| 2004/0057348 A1 | 3/2004 | Shteyn et al. |
| 2004/0057449 A1 | 3/2004 | Black |
| 2004/0064476 A1 * | 4/2004 | Rounds ............... 707/104.1 |
| 2004/0068606 A1 | 4/2004 | Kim et al. |
| 2004/0078383 A1 * | 4/2004 | Mercer et al. ............... 707/102 |
| 2004/0083273 A1 | 4/2004 | Madison et al. |
| 2004/0088348 A1 | 5/2004 | Yeager et al. |
| 2004/0103153 A1 | 5/2004 | Chang et al. |
| 2004/0117442 A1 | 6/2004 | Thielen |
| 2004/0117843 A1 | 6/2004 | Karaoguz et al. |
| 2004/0128308 A1 | 7/2004 | Obrador |
| 2004/0137882 A1 | 7/2004 | Forsyth |
| 2004/0148353 A1 | 7/2004 | Karaoguz et al. |
| 2004/0162871 A1 | 8/2004 | Pabla et al. |
| 2004/0162878 A1 | 8/2004 | Lewis et al. |
| 2004/0174905 A1 | 9/2004 | Caspi et al. |
| 2004/0177116 A1 | 9/2004 | McConn et al. |
| 2004/0184778 A1 | 9/2004 | Jung et al. |
| 2004/0196315 A1 | 10/2004 | Swearingen et al. |
| 2004/0199667 A1 | 10/2004 | Dobbins |
| 2004/0201609 A1 | 10/2004 | Obrador |
| 2004/0205028 A1 * | 10/2004 | Verosub et al. ............... 705/59 |
| 2004/0215731 A1 | 10/2004 | Tzann-en Szeto |
| 2004/0220791 A1 | 11/2004 | Lamkin et al. |
| 2004/0220926 A1 | 11/2004 | Lamkin et al. |
| 2004/0221299 A1 | 11/2004 | Gibbs et al. |
| 2004/0226039 A1 | 11/2004 | Jung et al. |
| 2004/0236568 A1 | 11/2004 | Guillen et al. |
| 2004/0252604 A1 | 12/2004 | Johnson et al. |
| 2004/0260753 A1 | 12/2004 | Regan |
| 2004/0267812 A1 | 12/2004 | Harris et al. |
| 2005/0004985 A1 | 1/2005 | Stochosky |
| 2005/0004995 A1 | 1/2005 | Stochosky |
| 2005/0021398 A1 | 1/2005 | McCleskey et al. |
| 2005/0021470 A1 | 1/2005 | Martin et al. |
| 2005/0021750 A1 | 1/2005 | Abrams |
| 2005/0027539 A1 | 2/2005 | Weber et al. |
| 2005/0038707 A1 | 2/2005 | Roever et al. |
| 2005/0038724 A1 | 2/2005 | Roever et al. |
| 2005/0038814 A1 | 2/2005 | Iyengar et al. |
| 2005/0038819 A1 | 2/2005 | Hicken et al. |
| 2005/0038877 A1 | 2/2005 | Gupta et al. |
| 2005/0044229 A1 | 2/2005 | Brown |
| 2005/0055472 A1 | 3/2005 | Krzyzanowski et al. |
| 2005/0060264 A1 | 3/2005 | Schrock et al. |

(56) References Cited

U.S. PATENT DOCUMENTS

| | | |
|---|---|---|
| 2005/0065935 A1 | 3/2005 | Chebolu et al. |
| 2005/0071780 A1 | 3/2005 | Muller et al. |
| 2005/0086309 A1 | 4/2005 | Galli et al. |
| 2005/0086606 A1 | 4/2005 | Blennerhassett et al. |
| 2005/0091069 A1 | 4/2005 | Chuang |
| 2005/0102191 A1 | 5/2005 | Heller |
| 2005/0108176 A1* | 5/2005 | Jarol et al. ............ 705/59 |
| 2005/0108320 A1 | 5/2005 | Lord et al. |
| 2005/0114324 A1 | 5/2005 | Mayer |
| 2005/0138543 A1 | 6/2005 | Liu |
| 2005/0146996 A1 | 7/2005 | Roman |
| 2005/0160111 A1 | 7/2005 | Plastina et al. |
| 2005/0172001 A1 | 8/2005 | Zaner et al. |
| 2005/0197906 A1 | 9/2005 | Kindig et al. |
| 2005/0198317 A1 | 9/2005 | Byers |
| 2005/0210396 A1 | 9/2005 | Galli |
| 2005/0210507 A1 | 9/2005 | Hawkins et al. |
| 2005/0216443 A1 | 9/2005 | Morton et al. |
| 2005/0216855 A1 | 9/2005 | Kopra et al. |
| 2005/0227676 A1 | 10/2005 | De Vries |
| 2005/0234875 A1 | 10/2005 | Auerbach et al. |
| 2005/0234995 A1 | 10/2005 | Plastina et al. |
| 2005/0240494 A1 | 10/2005 | Cue et al. |
| 2005/0246651 A1 | 11/2005 | Krzanowski |
| 2005/0251565 A1 | 11/2005 | Weel |
| 2005/0251566 A1 | 11/2005 | Weel |
| 2005/0251576 A1 | 11/2005 | Weel |
| 2005/0251807 A1 | 11/2005 | Weel |
| 2005/0262186 A1 | 11/2005 | Szeto |
| 2006/0008256 A1 | 1/2006 | Khedouri et al. |
| 2006/0010240 A1 | 1/2006 | Chuah |
| 2006/0031770 A1 | 2/2006 | McMenamin |
| 2006/0041627 A1 | 2/2006 | Tu |
| 2006/0056324 A1 | 3/2006 | Hyyppa et al. |
| 2006/0080103 A1 | 4/2006 | Van Breemen |
| 2006/0095502 A1 | 5/2006 | Lewis et al. |
| 2006/0107297 A1 | 5/2006 | Toyama et al. |
| 2006/0123058 A1 | 6/2006 | Mercer et al. |
| 2006/0123113 A1 | 6/2006 | Friedman |
| 2006/0133768 A1 | 6/2006 | Ellis |
| 2006/0143236 A1 | 6/2006 | Wu |
| 2006/0167985 A1 | 7/2006 | Albanese et al. |
| 2006/0173838 A1 | 8/2006 | Garg et al. |
| 2006/0190410 A1 | 8/2006 | Harper |
| 2006/0195462 A1 | 8/2006 | Rogers |
| 2006/0218195 A1 | 9/2006 | LaChapelle et al. |
| 2006/0242073 A1* | 10/2006 | Padawer et al. ............ 705/51 |
| 2006/0242259 A1* | 10/2006 | Vallabh et al. ............ 709/217 |
| 2007/0011206 A1 | 1/2007 | Gupta et al. |
| 2007/0016865 A1 | 1/2007 | Johnson et al. |
| 2007/0050413 A1 | 3/2007 | Kominek et al. |
| 2007/0143740 A1 | 6/2007 | Hoerentrup et al. |
| 2007/0159934 A1 | 7/2007 | Weon |
| 2007/0191108 A1 | 8/2007 | Brunet De Courssou et al. |
| 2008/0215882 A1 | 9/2008 | Coldicott et al. |

FOREIGN PATENT DOCUMENTS

| | | |
|---|---|---|
| WO | WO 02/33579 | 4/2002 |
| WO | WO02/071678 A2 * | 9/2002 |
| WO | WO 2004/046874 | 6/2004 |

OTHER PUBLICATIONS

Notification Concerning Transmittal of International Preliminary Report on Patentability dated Oct. 4, 2007 PCT/US06/006440.

Notification Concerning Transmittal of International Preliminary Report on Patentability dated Sep. 20, 2007 PCT/US06/006934 •.

Notification of Transmittal of the International Search Report and the Written Opinion of the International Searching Authority, or the declaration dated Oct. 19, 2007 PCT/US06/06683.

Notification Concerning Transmittal of International Preliminary Report on Patentability (PCT/US2006/006687).

Notification of Transmittal of the International Search Report and the Written Opinion of the International Searching Authority, or the Declaration (PCT/US06/07124).

Brown, Janelle; "MP3 free-for-all"; [Online] XP002219000; Retrieved from the Internet http://groups.google.com/groups?selm=Pine.GSU.4.10.10002050020300.16171-100000%40adore.lightlink.com&output=gplain; retrieved on Oct. 30, 2002; 6 pages.

Epema D. H. J. ,et al."Music2Share-Copyright-Compliant Music Sharing in P2P Systems" Proceedings of the IEEE, col. 92, No. 6; Jun. 1, 2004; pp. 961-970.

Supplementary Search Report EP 06 73 6092.5 dated Aug. 20, 2009; 3 pages.

Guterman, Jimmy: "Will AOL Tame Aimster?—file sharing system piggyback's on AOL instant messaging-Company Business and Marketing"; [Online] XP002532806; Dec. 18, 2000; Retrieved from the Internet http://findarticles.com/p/articles/mi_mOHWW/is_51_3/ai_68156286/ retrieved on Jun. 18, 2009; 3 pages.

Yang B. et al; "Comparing Hybrid peer-to-peer systems" Proceedings of the 27th VLDB Conference, Roma, Italy; Sep. 11, 2001; pp. 561-570.

Supplementary Search Report EP 06 73 6090.9 dated Jun. 18, 2009; 3 pages.

International Preliminary Report on Patentability (PCT/US2006/006932) dated Mar. 17, 2009; 7 pages.

Bassoli, Andrea, et al., "tunA: Local Music Sharing with Handheld Wi-Fi Devices", Proc. of the 5th Wireless World Conf. 2004, pp. 1-23.

Pachet, Francois, et al., "Content Management for Electronic Music Distribution", Communications of the ACM, vol. 46, Issue 4, Apr. 2003, pp. 71-75.

Swain, Michael J. "Searching for Multimedia on the World Wide Web", IEEE Conf. on Multimedia Computing and Systems, vol. 1, Jun. 7-11, 1999, pp. 32-37.

Lienhart, Rainer, et al., "Improving Media Services on P2P Networks", IEEE Internet Computing, vol. 6, Issue 1, Jan.-Feb. 2002, pp. 73-77.

Davies, Nigel, et al. "Supporting Adaptive Video Applications in Mobile Environments", IEEE Communications Magazine, vol. 36, issue 6, Jun. 1998, pp. 138-143.

Macedonia, Michael, "Distributed File Sharing: Barbarians at the Gates?", Computer, vol. 33, Issue 8, Aug. 2000, pp. 99-101.

Swierk, et al. "The Roma Personal Metadata Service", Mobile Networks and Applications, vol. 7, No. 5, Oct. 2002, pp. 407-418.

Qian, Yuechen, et al. "Exploring the Potentials of Combining Photo Annotating Tasks with Instant Messaging Fun", Mum 2004, College Park, MD, Oct. 27-29, 2004, pp. 11-17.

Regan, Tim, et al. "Media Center Buddies: Instant Messaging Around a Media Center", NordiCHI '04, Tampere, Finlad, Oct. 23-27, 2004, pp. 141-144.

Gottesman, Ben Z., "IM Your Photos", PCMag.com, Dec. 11, 2003, pp. 1-2 (downloaded from www.pcmag.com/print_article2/0,1217,a=114405,00.asp).

Bassoli, Arianna et al, "TunA: A Mobile Music Experience to Foster Local Interactions", UbiComp 2003, Seattle, WA, OCt. 12-15, 2003, pp. 1-2.

Grinter, Rebecca E., et al. "Instant Messaging in Teen Life", CSCW '02, New Orleans, LA, Nov. 16-20, 2002, pp. 21-30.

Qian, Yuechen, et al. "Turning Photo Annotating Tasks into Instant Messaging Fun: Prototyping, User Trials and Road Mapping, "ICEC 2004, LCNS 3166, vol. 3166/2004, Springer, Berlin, Aug. 4, 2004, pp. 610-613.

Coursey, David, "My Favorite Ways to Share Digital Photos", ZDNet, Nov. 7, 2003, pp. 1-3 (downloaded from reviewzdnet.com/AnchorDesk/4520-7298_16-5103567.html).

Bolcer, Gregory Alan., "Magi:An Architecture for Mobile and Disconnected Workflow", IEEE Internet Computing, vol. 4 Issue 3, May/Jun. 2000, pp. 46-54.

Rajani, Rakhi E., et al., "viewing and Annotating Media with MemoryNet", CHI 2004, Vienna, Austria, Apr. 24-29, 2004, pp. 1517-1520.

Microsoft Computer Dictionary, 4th Edition, Microsoft Press, Redmond, WA, 1999, p. 348.

(56) References Cited

OTHER PUBLICATIONS

Bayardo, Roberto J., et al. "Peer-to-Peer Sharing of Web Applications", WWW 2003, Budapest, Hungary, May 20-24, 2003, pp. 1-2.
Gradman, Eric, "Distributed Social Software", Dec. 12, 2003, pp. 1-10.
Pachet, Francois, et al. "Popular Music Access: The Sony Music Browser", Journal of the American Society for Information Science and Technology, vol. 55, issue 12, May 13, 2004, pp. 1037-1044.
Wolz, Ursula, et al., "r-Music, A Collaborative Music DJ for Ad Hoc Networks,", WEDELMUSIC '04, Sep. 13-14, 2004, pp. 144-150.
Crossen, Andrew, et al., "Flytrap: Intelligent Group Music Recommendation", RIDE-VE '99, Sydney, Australia, Mar. 23-24, 1999, pp. 148-155.
Hauver, David B., et al., "Flycasting: USing Collaborative Filtering to Generate a Playlist for Online Radio", WEDELMUSIC '01 Nov. 23-24, 2001, pp. 123-130.
Ku, William, et al., "Survey on the Technological Aspects of Digital Rights Management", ISC 2004, LNCS 3225, Springer, Berlin, Sep. 21, 2004, pp. 391-403.
Liang, Dianhui, et al. "A United Approach to Discover Multimedia Web Services", ISMSE '03, Dec. 10-12, 2003, pp. 62-69.
Microsoft Computer Dictionary, 4th Edition, Microsoft Press, Redmond, WA, 1999, p. 348 and 461.
Imad M. Abbadi, Chris J. Mitchell, "Digital Rights Management Using a Mobile Phone", Aug. 2007, ICEC '07: proceedings of the ninth international conference on Electronic commerce, Publisher: ACM, pp. 185-194.
Hayes, Conor, et al. "Context Boosting Collaborative Recommendation", Knowledge-Based Systems, vol. 17, issues 2-4, May 2004, pp. 131-138.
Tzanetakis, George, "Musescape: A Tool for Changing Music Collections into Libraries", ECDL 2003, LNCS 2769, Springer-Verlag, berlin, Feb. 26, 2004, pp. 412-421.
Cano, Pedro, et al. "MTG-DB: A Repository for Music Audio Processing", WEDELMUSIC '04, Sep. 13-14, 2004, pp. 2-9.
Vinet, Hughes, et al. "The CUIDADO Project", IRCAM, 2002, pp. 1-7.
Microsoft Computer Dictionary, 5th Edition, Microsoft Press, Redmond, WA, 2002, pp. 19, 410, 539 and 542.
Stauffer, "How to do everything with iTunes for Macintosh and Windows." published Feb. 27, 2004, 11 pages.
Mac Observer. "iTunes 4 Tip-Sharing iTunes libraries over IP; It's not just for Rendezvous". published Apr. 29, 2003 to MacsOberver.com; 2 pages.
Lee, Kyung Hee, et al., "Requirements and Referential Software Architecture for home Server based Inter-Home Multimedia Collaboration Services", IEEE transactions on Consumer Electronics, Vlume 50, Issue 1, Feb. 2004, pp. 145-150.
Haneef, Anwar M., et al., "ANMoLe—An Adaptive Multimedia Content Delivery Middleware Architecture for Heterogenous Mobile Multi-Device Neighborhoods", Multimedia Tools and Applications, vol. 22, No. 2, Feb. 2004, pp. 171-186.
Written Opinion of the International Search Authority (PCT/US06/06604), Jun. 18, 2007.
International Search Report (PCT/US06/06440), Jun. 18, 2007.
Notification of Transmittal of the International Search Report and the Written Opinion of the International Searching Authority, or the Declaration (PCT/US06/06685), Feb. 18, 2008.
Notification Concerning Transmittal of International Preliminary Report on Patentability (PCT/US2006/006687), Oct. 24, 2007.
Notification of Transmittal of the International Search Report and the Written Opinion of the International Searching Authority, or the Declaration (PCT/US06/07124), Dec. 5, 2007.

\* cited by examiner

SYSTEM AND METHOD FOR IMPROVED PORTABLE MEDIA FILE RETENTION

This application claims priority from Provisional U.S. Patent Application Ser. No. 60/657,222, filed Feb. 28, 2005, and Provisional U.S. Patent No. 60/678,718 filed May 5, 2005, which are hereby incorporated by reference in their entirety. This application is also related to the U.S. patent application Ser. No. 11/303,097, entitled "Portable Media Device Interoperability", filed on Dec. 16, 2005, the contents of which are hereby incorporated by reference in their entirety.

This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD OF THE INVENTION

The present invention relates to the field of media CDs, and more specifically to the creation and maintenance of playlists for CD-ROM and other removable media CDs.

BACKGROUND OF THE INVENTION

The advent of digital computers has greatly changed how users transport and access music, movies, television shows, photographs, and other sensory-stimulating content. Digital recording, storage, and reproduction technologies allow users to experience a wide variety of content from relatively small, portable CDs such as CD-ROM and DVD players. As used herein, the term "CD player" is intended to include, but is not limited to, CDs capable of playing and/or recording CD-ROM's, DVD's, and other portable, removable media. Similarly, the terms "CD" and "CD-ROM" are intended to include, but are not limited to, write-once and rewritable portable, removable media, including, without limitation, CD+RW, DVD-RW, BluRay DVD's, and the like.

The creation of the Motion Picture Entertainment Group Layer 3 ("MP3") audio encoding standard has allowed CD's to carry even more than the 72 or 80 minutes of music traditionally carried by such media by changing the method by in which the audio files are stored. Similarly, inexpensive, high-resolution digital video cameras are now available for home and professional video creation, and a wide variety of software is available that allows consumers and professionals to easily create new content. Combined with the popularity and low cost of CD writing hardware (referred to generally as "burners") and the related media, this has lead to an explosion in the number of portable CD players.

While portable CD players give users the ability to carry entire music and/or video libraries or other such single- and multi-media content on a handful of physical media, such CDs often pose unique problems for users. For example, users can become bored with accessing the same content over and over, even where the order and/or frequency of playback is determined through one or more playlists. Thus, users frequently wish to update their CD's with new content.

Users can add content to a CD, and especially a rewritable CD, through a variety of means. With respect to music content, such means include creating one or more content files from songs on a commercial audio CD, DVD, audio or video tape, or phonograph, a process referred to as "ripping". While ripping is popular, it requires that a user visit a bricks-and-mortar or online retailer, purchase the CD or other physical copy of the content, and then take the time to convert the content file or files into the desired format and burn the ripped content to a new CD. This is both time consuming and technologically challenging for many consumers. To help facilitate users gaining access to larger music libraries, and thus allowing users to enhance the scope of content available on CD's, some services have been launched through which a user can download an MP3 or other content file from an online music source.

Several different content sources have become available in recent years, and many use differing business models. One business model, supported by the Yahoo! Music Engine service offered by Yahoo!, Inc. of Sunnyvale, Calif., is the "tethered-download" or subscription model. In this model, users pay a flat fee to download content files from a central source to their home computer. This flat fee is typically relatively low because content downloaded from such services is protected using digital rights management ("DRM") technology, and will frequently expire (i.e. cannot be played or accessed) if the user stops subscribing to the service.

While such services have gained in popularity, not all content can be burned to CD's, because CD players do not generally support digital rights management. Thus, the user is not able to take full advantage of the content provided by such services.

SUMMARY OF THE INVENTION

Accordingly, the present invention is directed to a system and method creating playlists for CD's, and for obtaining appropriate DRM rights for the content in such playlists, that substantially obviates one or more of the problems due to limitations and disadvantages of the related art.

It is an object of the present invention to provide a method of acquiring rights to content to be burned to a CD, comprising defining a first content set, wherein at least one content attribute is associated with each member of the first content set; defining a second content set, wherein the second content set is comprised of content selected from the first content set whose content attributes match those selected by a user; identifying as a third content set that content in the second content set for which digital rights management rights sufficient to permit the content to be burned to the CD are not currently possessed; allowing a user to authorize obtaining rights for at least a subset of the second content set for which rights sufficient to permit the content to be burned to the CD are not currently possessed; obtaining rights which allow at least a subset of the third content set to be burned to the CD; and, allowing the content defined in the second content set and for which appropriate rights have been obtained to be burned to the CD.

It is a further object of the invention to provide A user interface for defining content to be burned to a CD, comprising a list of available content; a selected content list; and a transfer content user interface element; wherein the user interface allows content from the list of available content to be added to the selected content list, wherein content in the selected content list for which the user has appropriate rights to allow the content to be burned to a CD are presented differently than other content, and wherein, upon activation of the transfer content user interface element, rights are obtained to burn to the CD any content in the selected content list for which the user does not have appropriate rights.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

An embodiment of the invention is implemented as part of content management software for CD's. The software allows a user to easily build one or more "playlists", or lists of content to be burned to a CD, and to associate the playlist with a given CD such that changes to the content in the playlist are automatically transferred to the CD when the CD is synchronized or otherwise connected to a content source, or such a content source is made available to the CD. Such content sources may include, without limitation, content stored on a computer associated with the user, content stored remotely on a server, and content available from other users.

In a preferred embodiment, playlists may include individual content entries selected by the user (such as by dragging and dropping entries from a list of available content onto the playlist), and/or rules by which content available to the user can be selected for inclusion in the playlist. By way of example, without intending to limit the present invention, a playlist rule may indicate that all content by the user's three favorite artists are to be given the highest priority, and that randomly selected content of a specific genre is to be given the next highest priority. The software can then select from the available content that content which meets the user-defined rules and can add such content to the playlist.

The software can also preferably monitor content added to a playlist and automatically determine whether the user has the rights necessary to allow the content to be burned to the CD. By way of example, without intending to limit the present invention, the user may specify that as new content from a favorite artist becomes available, that content should be automatically added to the playlist, and sufficient DRM rights to the content should be obtained which allow the content to be burned to the CD.

In one embodiment, the software also provides visual feedback to the user regarding the DRM licensing status of particular content with respect to a given CD. Such feedback may include, but is not limited to, displaying the title, artist, track, or other information associated with content for which the user does not have an appropriate DRM license in a different font, altering the color of the font, altering the background behind the text, striking through the text, drawing a box around the text, or the like. Furthermore, the software may order the playlist so that entries corresponding to content for which appropriate licensing information is not available appear at the bottom or top of the playlist, or in an alternative window or portion of the window associated with the playlist.

The software can also allow new content to be burned to a CD. Such content can be selected based on the contents of a playlist. By way of example, without intending to limit the present invention, a user's preferences may be determined based on the frequency with which an artist or genre appears within a playlist, based on the frequency with which a particular content file is played by the user, based on the user's ratings of different content within the playlist, or combinations thereof. The software can then select new content that has similar characteristics to those preferred by the user and the new content can be added to the playlist, thereby allowing the user to access new content. Similarly, rules associated with a playlist may be used to select appropriate content.

Where a CD is capable of storing new content, the new content can merely be added to the CD. However, where the CD is too full to allow new content to be copied thereto, the software can substitute the new content for content in the playlist associated with the CD. The user can preferably control the number of playlist entries and/or content files that can be substituted, and the frequency with which such substitutions may occur. The user can also preferably control the manner in which the software chooses a content file or files for which the new content is to be substituted. By way of example, without intending to limit the present invention, the user may choose the content files to be removed, the user may choose to have the lowest rated content removed first, or the user may choose to have the least frequently accessed content removed first.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of at least one embodiment of the invention.

In the drawings.

DETAILED DESCRIPTION OF THE PREFERRED EMBODIMENT

Reference will now be made in detail to the preferred embodiments of the present invention, examples of which are illustrated in the accompanying drawings.

An aspect of the present invention allows a user to easily acquire rights to content to be burned to a CD. The rights necessary may vary depending on the rules related to copying such content set forth by the content's author, publisher, or other content provider.

Figure 1:
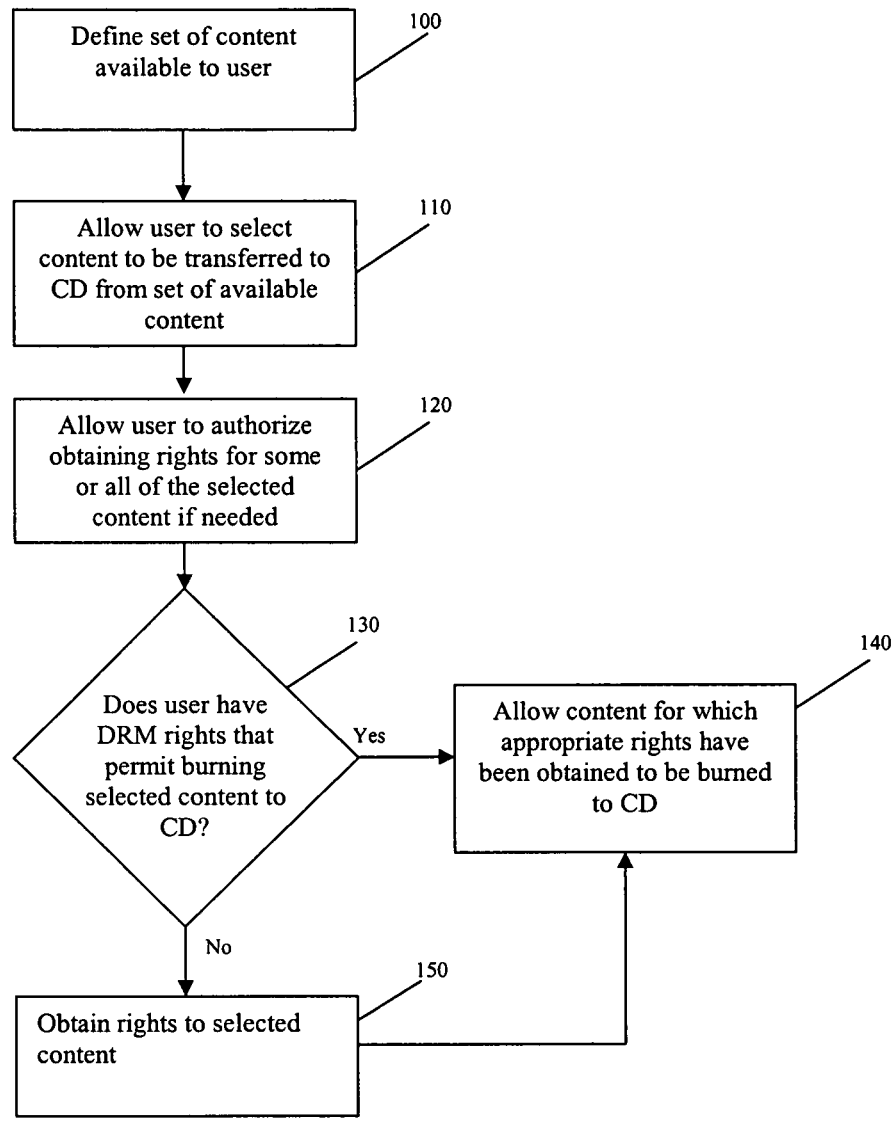
FIG. 1 is a block diagram illustrating a method through which content can be added to a CD.

FIG. 1 is a block diagram illustrating a method through which content can be added to a playlist associated with a CD. In Block 100 of FIG. 1, a set of content is defined which includes content available to the user. Such content may include, but is not limited to, content ripped by the user, content available to the user by virtue of the user having subscribed to a content provider, and content available for a fee from another source. In a preferred embodiment, such content will have at least one attribute, such as, without limitation, access frequency, size, artist, actor(s), title, genre, producer, director, album, track, scene, or the like associated therewith. Such attributes typically simplify identifying content files and allow users to more easily find and access the associated content.

In Block 110, the user selects content to be transferred to the CD from the set of user-accessible content. In one embodiment, this user-selected content can be stored in a playlist associated with the CD, thereby facilitating maintenance of the content stored on the CD.

In an alternative embodiment, if the user so chooses, new content can be added to a playlist associated with a CD at user-defined intervals, thereby adding variety to the content available to the user via the CD. By way of example, without intending to limit the present invention, if a user has a favorite artist, new content created by that artist can be copied to the CD when the new content becomes available. As another example, the user's content preferences can be determined by analyzing the attributes associated with the contents of a playlist. These preferences can then be used to identify content similar to that preferred by the user, and thereby allow the user to access content with which the user is not familiar, and to which the user may not otherwise have had access. Such similarities may be based on user preferences as evidenced by a playlist, including the frequency with which specific content is accessed, the user's ratings of specific content, and the like. The similarities may be based on general content attributes, such as those described above, or based on rhythm, words appearing in the lyrics or script, themes, orchestration, colors, settings, character types, or other such characteristics.

New content can be added to the playlist when requested by the user, or at pre-defined intervals, such as, without limitation, daily, weekly, or monthly. Similarly, the last date on which content was accessed can be used to determine when new content should be substituted for the content. By way of example, a user may specify that any content that has not been accessed with the past two months is to be removed from a playlist, and new content substituted therefor.

New content can be substituted for another entry or entries in a playlist associated with a portable media player, as necessary, based on one or more criteria. Such criteria can include, but are not limited to, the space available on the CD, the number of content files supported by the CD, and the like. Selection of content to be removed from a playlist can occur based on a variety of user-selectable options. By way of example, without intending to limit the present invention, the user may select the content to be removed. Continuing the example, the content may be automatically removed based on the frequency with which the content has been accessed by the user; the user's rating of the content; the user's preference for a given genre, artist, or the like; or combinations thereof. Such preferences may be determined based on the content comprising the playlist.

In Block 120, the user can authorize the software to obtain rights sufficient to allow some or all of the selected content to be burned to a CD. In one embodiment of this step, the user can identify favorite artists, favorite genres, or enter more complex rules, and thereby pre-authorize the purchasing of any rights necessary to allow burning to the CD of any new content meeting the user's specifications. By way of example, without intending to limit the present invention, a user may like music by the Rolling Stones, but may not care for some of the Rolling Stones' early works. Such a user can enter a rule that pre-authorizes the purchase of any new Rolling Stones songs that may become available, but which does not pre-authorize the purchase of Rolling Stones songs recorded before 1990.

In another embodiment, the user indicate that all rights necessary to permit the selected content to be burned to a CD should be automatically obtained without further user intervention. Still another embodiment requires user intervention for each content file for which rights must be obtained. The set of embodiments described above is intended to be exemplary, and it should be apparent to one skilled in the art that the embodiments can be combined, alternative embodiments may be substituted therefor, or embodiments added thereto, without departing from the spirit or the scope of the invention.

In Block 130, the DRM attributes associated with the content to be transferred to the CD are examined to determine whether the user has rights that permit burning the selected content to a CD. In Block 140, where the content's DRM attributes permit the content to be copied to a CD, burning of the selected tracks is allowed.

Where the user does not have appropriate rights, the appropriate rights are obtained to the content consistent with the user's preferences as set forth in Block 120. If no such preferences are specified, the user is preferably asked to authorize obtaining rights for each content file for which such rights are necessary.

While FIG. 1 presents blocks 100 through 130 as occurring in a particular order, it should be apparent to one skilled in the art that alternative orders may be substituted therefor without departing from the spirit or the scope of the invention.

Figure 2:
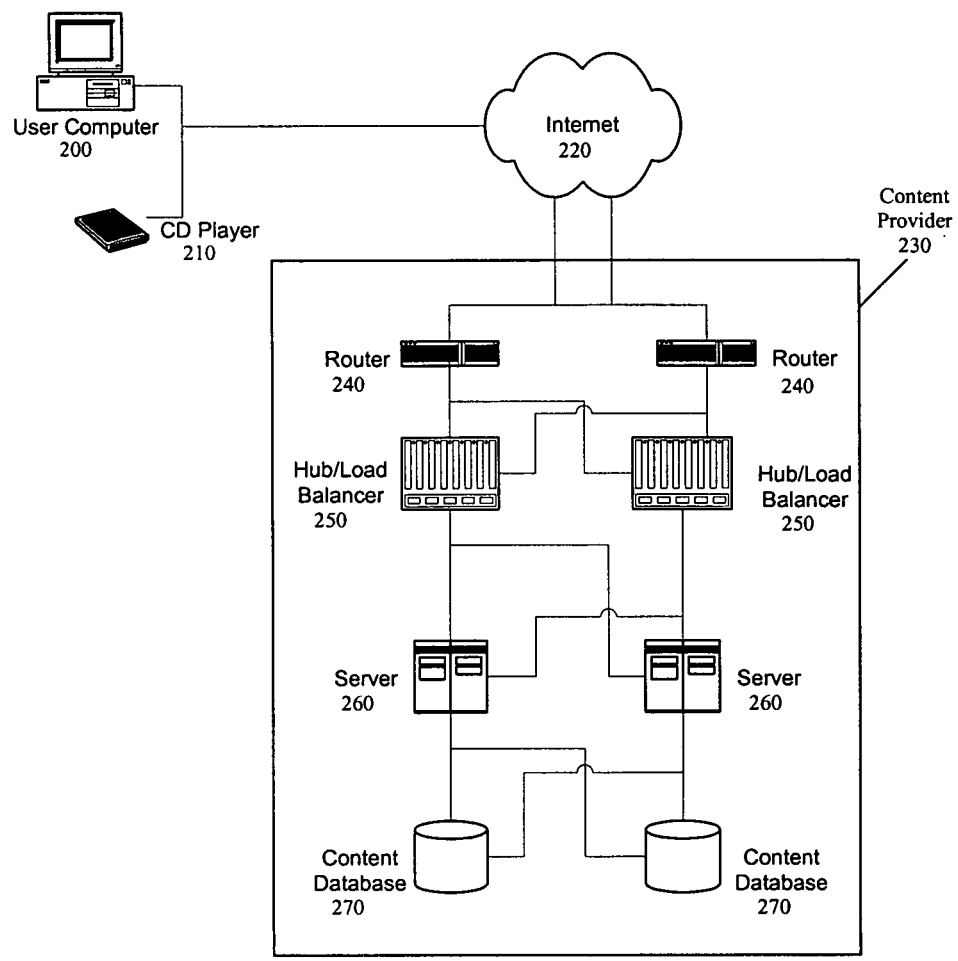
FIG. 2 is a block diagram of a network architecture capable of supporting the present invention.
Figure 3:
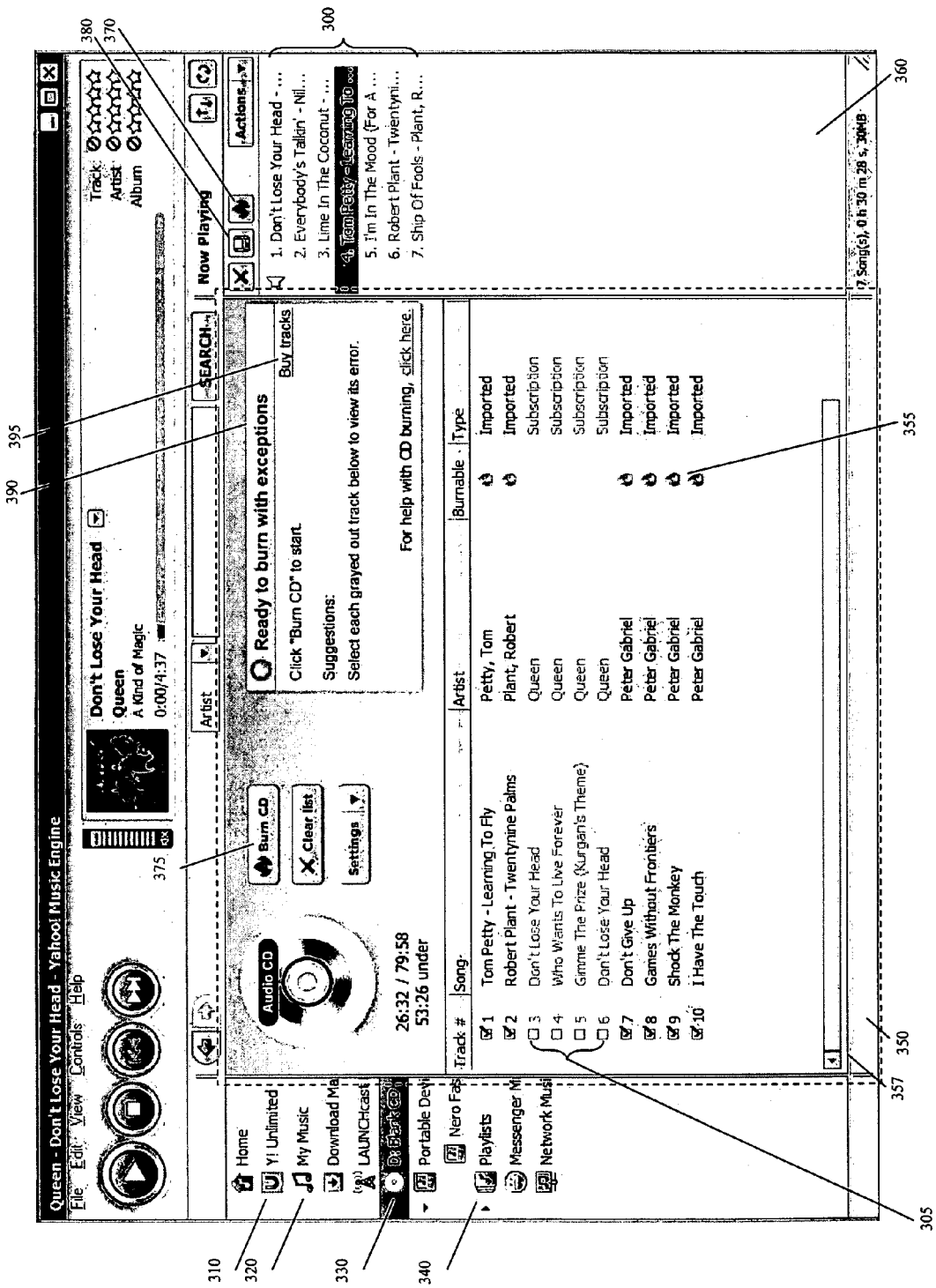
FIG. 3 is a screen capture illustrating a user interface through which individual content files can be added to a playlist, and through which a CD can be burned.

FIG. 2 illustrates an exemplary architecture through which the present invention can be implemented. In the embodiment illustrated in FIG. 2, it is assumed, as is standard at the present time, that CD Player/Burner 210 has limited communication and/or storage capabilities, and thus content to be burned by CD Player/Burner 210 must be obtained via a local resource such as user computer 200. However, it should be apparent to one skilled in the art that alternative content acquisition means, such as, without limitation, allowing CD Player/Burner 210 to directly access Internet 230, or allowing CD Player/Burner 210 to communicate directly with server 260 or content database 270 via a dedicated communications means, can be substituted therefor without departing from the spirit or the scope of the invention.

In the embodiment of FIG. 2, content is provided by content provider 230 to one or more user computers 200 via Internet 220. In the illustrated embodiment, content provider 230 employs a redundant architecture to provide improved availability, reliability, and scalability. While a redundant architecture is preferred, it should be apparent to one skilled in the art that a single server may be substituted therefore without departing from the spirit or the scope of the invention. Similarly, although a redundant architecture with only two of each hardware device is illustrated, it should be apparent to one skilled in the art that additional hardware devices can be added, or hardware devices removed, without departing from the spirit or the scope of the invention.

In the illustrated embodiment, routers 240 facilitate proper traffic flow between Internet 220 and other hardware employed by content provider 230. Router 240 may also provide firewall protection and other such services.

Routers 240 are communicatively coupled to hub/load balancers 250. Hub/load balancers 250 can preferably monitor the capabilities, workload assignments, and response times for each of servers 260. This allows hub/load balancers 250 to select the appropriate server or servers for any new incoming service requests.

In the illustrated embodiment, servers 260 preferably provide an interface to content databases 270. Servers 260 preferably authenticate users, control user access to content stored in content databases 270, monitor DRM rights associated with content stored in content databases 270, provide user computer 200 with a list of DRM compatible portable entertainment devices, and perform other such functions. Servers 260 preferably use hypertext markup language ("HTML"), extensible Markup Language ("XML") or other structured language to provide such an interface. In one embodiment, user computer 200 employs a browser or other software application capable of receiving HTML or XML information from servers 260 and converting this information into a user-readable form.

Users accessing user computer 200 can preferably select content to be downloaded and stored locally on user computer 200, to access content streamed to user computer 200 via content provider 230, and the like. As described above with respect to FIG. 1, where the DRM rights of a given content file permit burning the content file to a CD, the user can transfer content from user computer 200 to CD Player/Burner 210 via a wired or wireless connection. This can be done, for example, by associating a playlist stored on user computer 200 with a CD in CD Player/Burner 210.

Another aspect of the present invention is the provision of a user interface through which playlists can be created, associated with a CD, and maintained. Exemplary embodiments of such a user interface are illustrated in FIGS. 3 through 6. In the embodiment illustrated in FIG. 3, content is made available to the user from a plurality of content sources, including subscription service 310 and local content 320. When the user selects a content source, the user is presented with a list of available content. Such content can be organized based on one or more content attributes. In the illustrated embodiment, the content is organized by genre, with individual content entries listed in content pane 350. The user can select one or more content entries from a content pane and drag them to playlist area 360, where they are listed as content entries 300. When the user is satisfied with the content in playlist area 360, the user can store the playlist by clicking Save button 380. The playlist will then appear under playlists 340. When the user is ready to burn the content listed in the playlist to a CD, such as the Blank CD listed in CDs list 330, the user can click burn to CD button 370 or otherwise interact with a user interface element to initiate the burning process. An exemplary user interface for such a process is illustrated by region 350 of FIG. 3.

In a preferred embodiment, the DRM attributes of the selected content are examined to determine whether the user's rights are compatible with burning the content to a CD. If the user's rights are not compatible with burning the content to a CD, the user interface preferably indicates the incompatibility to the user. In the embodiment illustrated in FIG. 3, the user does not have rights compatible with burning content entries 305 to a CD, and the content entries are grayed out. In alternative embodiments, alternative means for indicating DRM incompatibilities may be used, including, without limitation, striking through the content entries, using a bold or italic font, using an alternative font, using an alternative font color, placing a DRM-associated icon next to or near the content entry, such as burnable icon 355, and the like.

Where rights permitting the selected content to be burned to a CD have not yet been obtained for one or more content files, a dialog box or other user interface element similar to that of user interface element 390 can be presented to the user. Such a user interface element preferably identifies the content for which rights to burn the content to a CD are still needed and provides instructions to the user as to how to remedy the incompatibility.

In one embodiment, the user interface element can allow the user to specify whether any necessary DRM rights are to be automatically obtained or whether such rights should be obtained through various degrees of user interaction. In another embodiment, the user interface element can allow the user to click on a single button, link, or the like, such as buy tracks link 395, to purchase the necessary rights to permit the entire set of selected content to be burned to a CD.

Figure 4:
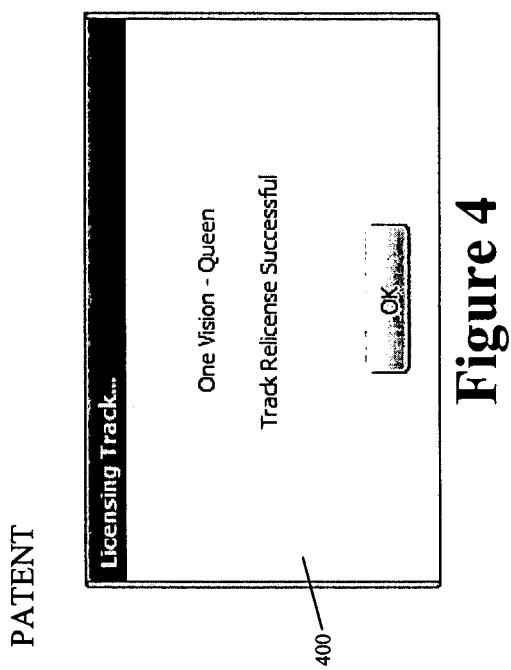
FIG. 4 is a screen capture illustrating a user interface through which track licensing status is provided to the user.

In a preferred embodiment, the user is advised as to the status of any license acquisition or reacquisition via a dialog box or other user interface element such as the dialog box 400 illustrated in FIG. 4. By way of example, without intending to limit the present invention, status information may also or alternatively be presented in status bar 357 of FIG. 3. The status information may also include the cost of any necessary licenses, and can allow the user to authorize payment of such costs. Payment can be made at that time via a credit card, debit card, or debit account associated with the user, or by adding the cost to the user's monthly fee. It should be apparent to one skilled in the art that alternative payment means may be substituted for those described herein without departing from the spirit or the scope of the invention.

Figure 5:
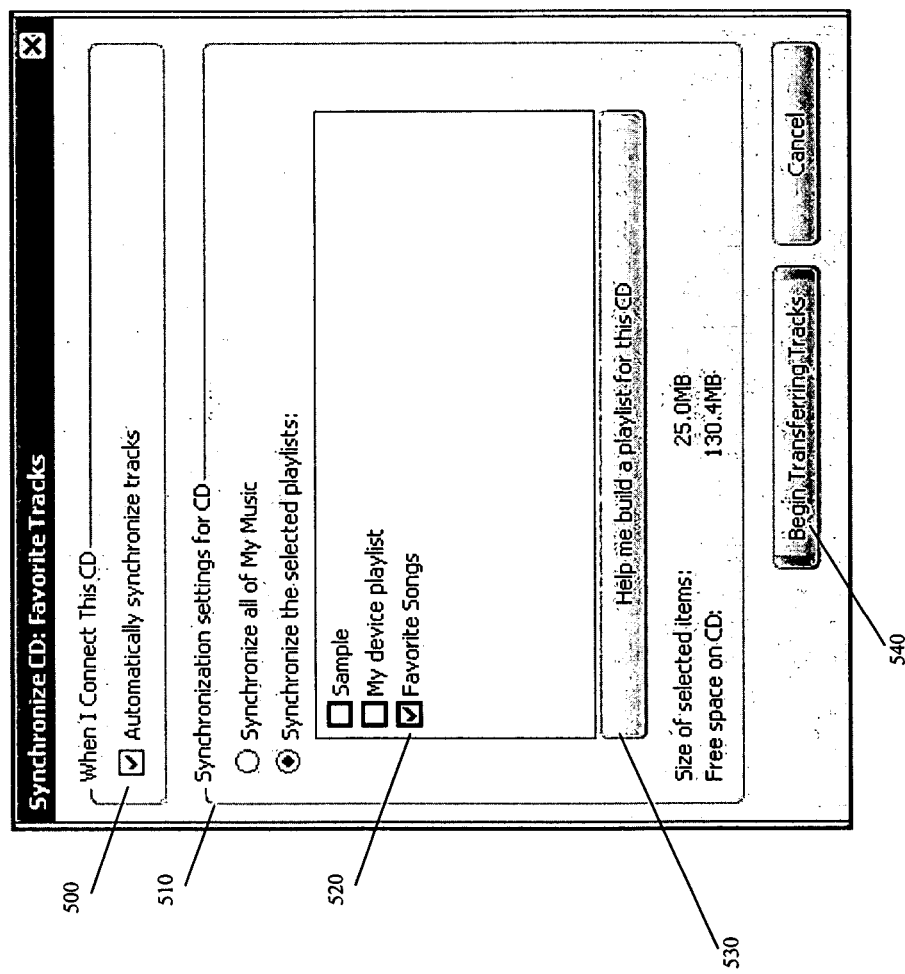
FIG. 5 is a screen capture illustrating a user interface through which synchronization settings can be configured for a CD.

FIG. 5 is a screen capture of an exemplary user interface through which the user can indicate one or more synchronization preferences for a given CD. Such synchronization may occur, for example, when a single-write CD still has storage capacity, or where the CD is rewritable. In this embodiment, the user can select, by checking checkbox 500, whether content should be automatically synchronized each time the CD is communicatively coupled to a content source, such as a local computer or content provider. If the CD is to be synchronized, the user can specify the synchronization settings in synchronization settings 510. In the illustrated embodiment, the user can elect to have all available local content synchronized, or to have content associated with one or more playlists, illustrated in Playlists 520, synchronized with the CD. Where the user wishes to create a new playlist to be associated with a CD, the user can click on build playlist button 530 or other activate another such user interface element.

Figure 6:
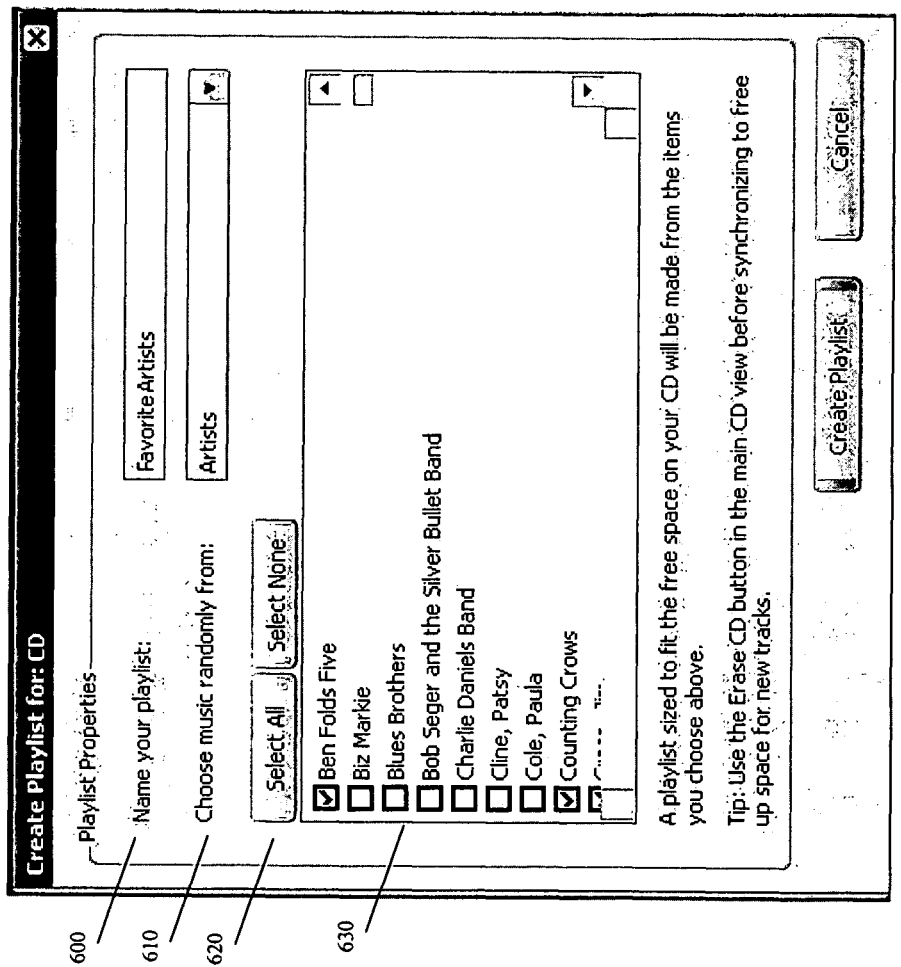
FIG. 6 is a screen capture illustrating a user interface through which a playlist can be automatically filled with content based on user preferences and/or rules.

Clicking on build playlist button 530 preferably causes a window similar to that illustrated in FIG. 6 to appear. The playlist creation window illustrated in FIG. 6 allows the user to name the playlist in text box 600, and to create rules governing how content is to be added to the playlist. In the illustrated embodiment, the user selects a content attribute type from content attribute type list 610, which causes a list of available content attributes to be listed in content attribute list 630. The user can then select one or more content attributes from content attribute list 630, or select all available content attributes using select all button 620. The user then clicks Create Playlist 640 or otherwise activates another such user interface element to initiate the generation of a playlist according to the rules specified by the user. Once the playlist has been generated, the content associated with the playlist can be burned to a CD using the methods described above.

While the invention has been described in detail and with reference to specific embodiments thereof, it will be apparent to those skilled in the art that various changes and modifications can be made therein without departing from the spirit and scope thereof. Thus, it is intended that the present invention cover the modifications and variations of this invention provided they come within the scope of the appended claims and their equivalents.

What is claimed is:

1. A method of acquiring digital rights to digital content to be burned to a CD, comprising:

determining, by a computer, a first digital content set, at least one content attribute being associated with each member of the first digital content set;

receiving, by the computer from a user, a selection of content from the first digital content set;

determining, by the computer, a second digital content set comprising content selected from the first digital content set whose content attributes match content attributes of content from the first digital content set that have been selected by the user;

determining, by the computer and in accordance with rules provided by the user, as a third digital content set, that content in the second digital content set for which digital rights management rights which enable the content to be burned to the CD are not currently possessed;

receiving a user preference regarding obtaining digital rights for the third digital content set;

automatically obtaining, by the computer, digital rights for at least a subset of the third digital content set based at least in part on the user preference; and transmitting, by the computer, the at least a subset of the third digital content set for which appropriate digital rights have been obtained to the user to enable the user to burn the at least a subset of the third digital content set to the CD.

2. The method of claim 1, wherein the second digital content set is represented as a play list associated with the CD.

3. The method of claim 2, further comprising adding additional content to the second digital content set based on the playlist.

4. The method of claim 3, further comprising automatically adding the additional content to the playlist.

5. The method of claim 4, further comprising substituting the additional content for the least frequently accessed content in the playlist.

6. The method of claim 1, further comprising adding additional content to the second digital content set based on the attributes selected by the user.

7. The method of claim 6, further comprising automatically adding the additional content to the second digital content set.

8. The method of claim 7, further comprising substituting the additional content for the least frequently accessed content in the second digital content set.

9. The method of claim 7, further comprising substituting the additional content for a plurality of content based on content size.

10. The method of claim 1, wherein the content attributes are comprised of random, access frequency, size, genre, artist, and album.

11. The method of claim 10, further comprising selecting from a plurality of the content attributes.

12. The method of claim 11, further comprising ordering the selected content attributes.

13. The method of claim 1, further comprising receiving rankings from the user for members of the first digital content set.

14. The method of claim 1, wherein the determining of the second content set further comprises determining, by the computer, a frequency with which to access content from the first digital content set and attributes associated with the most frequently accessed content.

15. The method of claim 1, further comprising automatically obtaining digital rights for burning the content to a CD for each member of the third digital content set.

16. The method of claim 1, wherein the at least a subset of the third digital content set comprises all members of the third digital content set.

17. The method of claim 16, further comprising automatically obtaining the digital rights.

18. The method of claim 1, further comprising determining whether digital rights to content stored on the CD have expired and prohibiting access to content for which the digital rights have expired.

19. The method of claim 18, further comprising obtaining additional digital rights to the content for which the digital rights have expired.

20. The method of claim 19, further comprising obtaining additional digital rights for at least a subset of the content for which the digital rights have expired.

21. The method of claim 20, further comprising automatically obtaining the additional digital rights automatically.

22. The method of claim 20, wherein the obtaining of the additional digital rights occurs after receiving user authorization.

23. The method of claim 1, wherein the CD is a rewritable CD.

24. A method comprising:

associating, by a server computer, a first digital content set with a user operating a computing device;

transmitting, by the server computer over a network to the computing device, the first digital content set;

receiving, by the server computer over the network from the computing device, a selection of content from the first digital content set to form a second digital content set; adjusting the content in the second digital content set in accordance with rules received from the user;

receiving, by the server computer over the network from the computing device, an authorization to obtain digital rights for one or more content in the second digital content set;

receiving a user preference regarding obtaining digital rights for the second digital content set;

automatically obtaining, by the server computer, the digital rights for the one or more content in the second digital content set based at least in part on the user preference; and transmitting, by the server over the network to the computing device, the obtained digital rights so that the user can burn the one or more content in the second digital content set to a CD.

25. An article, comprising a computer readable medium having stored thereon instructions to be executed by a first computer to:

associate a first digital content set with a user operating a second computer;

transmit over a network to the second computer, a first digital content set associated with the user;

receive over the network from the second computer, a selection of content from the first digital content set to form a second digital content set;

adjust the content in the second digital content set in accordance with rules received from the user;

receive over the network from the second computer, an authorization to obtain digital rights for one or more content in the second digital content set;

receive a user preference regarding obtaining digital rights for the second digital content set;

automatically obtain the digital rights for the one or more content in the second digital content set based at least in part on the user preference; and transmitting, by the first computer over the network to the second computer, the obtained digital rights so that the user can burn the one or more content in the second digital content set to a CD.

* * * * *